US 6,693,953 B2

(12) United States Patent
Cox et al.

(10) Patent No.: US 6,693,953 B2
(45) Date of Patent: *Feb. 17, 2004

(54) ADAPTIVE WIRELESS COMMUNICATION RECEIVER

(75) Inventors: Earl C. Cox, Montrose, CA (US); David O. Anderton, Rancho Santa Margarita, CA (US); Jaleh Komaili, Irvine, CA (US); Yongbing Wan, Irvine, CA (US); Scott Walley, Portola Hills, CA (US)

(73) Assignee: Skyworks Solutions, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,797

(22) Filed: Sep. 30, 1998

(65) Prior Publication Data

US 2003/0058929 A1 Mar. 27, 2003

(51) Int. Cl.⁷ .............................. H04L 27/30
(52) U.S. Cl. ............... 375/141; 455/13.4; 455/38.3; 455/67.3; 455/226.3; 370/332
(58) Field of Search ................. 375/142, 141, 375/150, 230, 343, 143, 152, 232; 708/323; 455/13.4, 38.3, 67.3, 134, 135, 161.3, 69, 226.2, 226.3; 370/290, 320, 332, 335, 342, 441

(56) References Cited

U.S. PATENT DOCUMENTS

| 3,604,911 A | 9/1971 | Schmitt ................. 235/181 |
| 3,975,628 A | 8/1976 | Graves et al. .......... 250/199 |
| 4,426,712 A | 1/1984 | Gorski-Popiel ............ 375/96 |
| 4,445,118 A | 4/1984 | Taylor et al. ............ 343/357 |
| 4,463,357 A | 7/1984 | MacDoran ............... 343/460 |

(List continued on next page.)

FOREIGN PATENT DOCUMENTS

| DE | 197 26 045 A1 | 1/1998 | ......... H04Q/7/14 |
| EP | 0511741 A1 | 3/1992 | |
| EP | 0511741 B1 | 3/1992 | |
| EP | 0639901 A2 | 5/1994 | |
| EP | 0639901 A3 | 8/1994 | |

(List continued on next page.)

OTHER PUBLICATIONS

D. J. R. Van Nee and A. J. R. M. Coenen, "New Fast GPS Code–Acquistion Technique Using FFT," Jan. 17, 1991, *Electronics Letters*, vol. 27, No. 2.

*Primary Examiner*—Stephen Chin
*Assistant Examiner*—Dac V. Ha
(74) *Attorney, Agent, or Firm*—Thomas, Kayden, Horstemeyer & Risley LLP

(57) ABSTRACT

The present invention provides methods and apparatus for controlling power utilization in a wireless communication receiver. A representative system comprises a signal properties evaluation module, an analog to digital converter (ADC), and an analog to digital converter control module. The signal properties evaluation module evaluates the stability of a received signal, and provides an indication of the stability. The ADC control module responds to the signal properties evaluation module to select the precision of the ADC based upon the indication of the stability. The ADC has at least two modes of operation, comprising a first precision and a second precision, and is responsive to the signal properties evaluation module to operate in at least one of two modes based upon the stability. The ADC responds to the signal properties evaluation module so as to limit the amount of power consumed by the wireless communications device.

15 Claims, 7 Drawing Sheets

U.S. PATENT DOCUMENTS

| | | | |
|---|---|---|---|
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |
| 4,890,233 A | 12/1989 | Ando et al. | 364/457 |
| 4,894,662 A | 1/1990 | Counselman | 342/357 |
| 4,894,842 A | 1/1990 | Broekhoven et al. | 375/1 |
| 4,992,720 A | 2/1991 | Hata | 320/23 |
| 4,998,111 A | 3/1991 | Ma et al. | 342/352 |
| 5,014,066 A | 5/1991 | Counselman, III | 342/352 |
| 5,018,088 A | 5/1991 | Higbie | 364/574 |
| 5,036,329 A | 7/1991 | Ando | 342/357 |
| 5,043,736 A | 8/1991 | Darnell et al. | 342/357 |
| 5,108,334 A | 4/1992 | Eschenbach et al. | 455/314 |
| 5,148,042 A | 9/1992 | Nakazoe | 307/65 |
| 5,153,591 A | 10/1992 | Clark | 341/51 |
| 5,179,724 A | 1/1993 | Lindoff | 455/76 |
| 5,202,829 A | 4/1993 | Geier | 364/449 |
| 5,225,842 A | 7/1993 | Brown et al. | 342/357 |
| 5,253,268 A | 10/1993 | Omura et al. | 375/1 |
| 5,276,765 A | 1/1994 | Fremman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A | 1/1995 | Eldridge | 434/11 |
| 5,379,224 A | 1/1995 | Brown et al. | 364/449 |
| 5,396,515 A | 3/1995 | Dixon et al. | 375/208 |
| 5,402,346 A | 3/1995 | Lion et al. | 364/436 |
| 5,402,347 A | 3/1995 | McBurney et al. | 364/443 |
| 5,410,747 A | 4/1995 | Ohmagari et al. | 455/118 |
| 5,416,712 A | 5/1995 | Geier et al. | 364/450 |
| 5,418,818 A | 5/1995 | Marchetto et al. | 375/264 |
| 5,420,593 A | 5/1995 | Niles | 342/357 |
| 5,440,313 A | 8/1995 | Osterdock et al. | 342/352 |
| 5,450,344 A | 9/1995 | Woo et al. | 364/449 |
| 5,450,442 A * | 9/1995 | Umemoto et al. | 375/230 |
| 5,498,239 A | 3/1996 | Galel et al. | 604/95 |
| 5,504,684 A | 4/1996 | Lau et al. | 364/443 |
| 5,546,445 A | 8/1996 | Dennison et al. | 379/60 |
| 5,548,613 A | 8/1996 | Kahu et al. | 375/208 |
| 5,550,811 A | 8/1996 | Kahu et al. | 370/18 |
| 5,568,473 A | 10/1996 | Hemmati | 370/18 |
| 5,577,023 A | 11/1996 | Marum et al. | 370/16 |
| 5,577,025 A | 11/1996 | Skinner et al. | 370/22 |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | 370/209 |
| 5,625,668 A | 4/1997 | Loomis et al. | 379/58 |
| 5,640,429 A | 6/1997 | Michels et al. | 375/340 |
| 5,640,431 A | 6/1997 | Bruckert et al. | 375/344 |
| 5,642,377 A | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,684,793 A * | 11/1997 | Kiema et al. | 370/335 |
| 5,689,814 A | 11/1997 | Hagisawa et al. | 455/69 |
| 5,722,061 A | 2/1998 | Hutchison, IV et al. | 455/245.1 |
| 5,734,674 A | 3/1998 | Fenton et al. | 375/207 |
| 5,734,966 A | 3/1998 | Farrer et al. | 455/63 |
| 5,737,329 A | 4/1998 | Horiguchi | 370/342 |
| 5,739,596 A | 4/1998 | Takizawa et al. | 307/66 |
| 5,749,067 A | 5/1998 | Barrett | 704/233 |
| 5,781,156 A | 7/1998 | Krasner | 342/357 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,835,047 A * | 11/1998 | Vorenkamp et al. | 341/156 |
| 5,841,396 A | 11/1998 | Krasner | 342/357 |
| 5,845,203 A | 12/1998 | LaDue | 455/414 |
| 5,854,605 A | 12/1998 | Gildea | 342/357 |
| 5,859,840 A * | 1/1999 | Tiedemann et al. | 370/335 |
| 5,862,465 A | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,878,329 A * | 3/1999 | Mallinckrodt | 455/69 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,917,444 A | 6/1999 | Loomis et al. | 342/357 |
| 5,917,829 A | 6/1999 | Hertz et al. | 370/479 |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A | 9/1999 | Sato | 370/335 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,315 A * | 11/1999 | Bazarjani et al. | 341/143 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.1 |
| 6,002,709 A | 12/1999 | Hendrickson | 375/206 |
| 6,009,551 A | 12/1999 | Sheynblat | 714/776 |
| 6,016,119 A | 1/2000 | Krasner | 342/357.06 |
| 6,023,462 A | 2/2000 | Nieczyporowicz et al. | 370/335 |
| 6,028,901 A * | 2/2000 | Huynh et al. | 375/229 |
| 6,041,222 A | 3/2000 | Horton et al. | 455/255 |
| 6,047,016 A | 4/2000 | Ramberg et al. | 375/200 |
| 6,047,017 A | 4/2000 | Cahn et al. | 375/200 |
| 6,049,715 A | 4/2000 | Willhoff et al. | 455/436 |
| 6,052,081 A | 4/2000 | Krasner | 342/357.02 |
| 6,052,405 A * | 4/2000 | Nakano | 375/200 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,067,446 A * | 5/2000 | Persson et al. | 455/69 |

| | | | | | | | |
|---|---|---|---|---|---|---|---|
| 6,075,809 A | 6/2000 | Naruse ........................ 375/147 | | 6,407,689 B1 | * 6/2002 | Bazarjani et al. ............ 341/143 | |
| 6,104,338 A | 8/2000 | Krasner ................. 342/357.06 | | 6,532,370 B1 | * 3/2003 | Underbrink et al. ......... 455/552 | |
| 6,104,340 A | 8/2000 | Krasner ................... 342/357.1 | | 6,538,592 B1 | * 3/2003 | Yang et al. .................. 341/155 | |
| 6,107,960 A | 8/2000 | Krasner ................. 342/357.09 | | | | | |
| 6,111,540 A | 8/2000 | Krasner ................... 342/357.1 | | FOREIGN PATENT DOCUMENTS | | | |
| 6,131,067 A | 10/2000 | Girerd et al. ................ 701/213 | | EP | 1 039 648 A | 9/2000 | ............ H04B/1/16 |
| 6,133,871 A | 10/2000 | Krasner ................. 342/357.06 | | EP | 1 158 705 A3 | 3/2003 | ........... H04B/17/00 |
| 6,133,873 A | 10/2000 | Krasner ................. 342/357.12 | | JP | 08/065205 | 6/1994 | |
| 6,133,874 A | 10/2000 | Krasner ................. 342/357.15 | | JP | 08/065205 A | 8/1994 | |
| 6,134,430 A | * 10/2000 | Younis et al. ................ 455/340 | | JP | 08065205 | 3/1996 | ........... H04B/1/707 |
| 6,148,044 A | * 11/2000 | Ono et al. .................... 375/343 | | WO | WO 92/13392 | 1/1992 | |
| 6,150,980 A | 11/2000 | Krasner ................... 342/357.1 | | WO | WO 00/19644 | 9/1999 | |
| 6,259,927 B1 | * 7/2001 | Butovitsch et al. ......... 455/522 | | | | | |
| 6,324,207 B1 | * 11/2001 | Kanterakis et al. ......... 375/141 | | * cited by examiner | | | |

ADAPTIVE WIRELESS COMMUNICATION RECEIVER

FIELD OF INVENTION

The present invention relates to the field of wireless communication and in particular to an adaptive receiver.

BACKGROUND OF THE INVENTION

The field of wireless communications is rapidly expanding. In particular, cellular communication systems are experiencing phenomenal growth. Likewise, cordless telephones are in widespread use.

Each mobile station, whether a cordless or cellular telephone, operates using power supplied by an associated battery. Each mobile station continually draws power from the battery while in standby mode or during an active communication link. The mobile unit draws the most power during periods of an active communication link. In particular, the receiver, which is responsible for obtaining, filtering, decoding and synthesizing the incoming signal, comprises a large percentage of total mobile unit power usage during an active communication link. This is especially true when the communication system comprises a modem cellular system, such as Global System for Mobile Communication (GSM) or a system adopting Code Division Multiple Access (CDMA) techniques. Modem communication systems adopt these complex coding schemes to increase both system capacity and voice quality.

SUMMARY OF THE INVENTION

The present invention is directed to unique methods and apparatus for controlling power utilization in a wireless communication receiver. A representative system, among others, comprises a signal properties evaluation module, an analog to digital converter, and an analog to digital converter control module. The signal properties evaluation module evaluates the stability of a received signal, and provides an indication of the stability. The analog to digital converter control module responds to the signal properties evaluation module to select the precision of the analog to digital converter based upon the indication of the stability. The analog to digital converter has at least two modes of operation, and is responsive to the signal properties evaluation module to operate in at least one of two modes based upon based upon the stability. The first mode comprises operation at a first precision and said second mode comprises operation at a second precision. The analog to digital converter responds to the signal properties evaluation module so as to limit the amount of power consumed by the wireless communications device.

A representative method, amoung others, comprises the steps of: receiving a signal; monitoring the characteristics of the incoming signal; evaluating the stability of the incoming signal; and altering the precision of an analog to digital converter based on the evaluated stability of the incoming signal so as to limit the amount of power consumed by said wireless communications receiver.

DETAILED DESCRIPTION OF THE PREFERRED EMBODIMENTS

Figure 1:
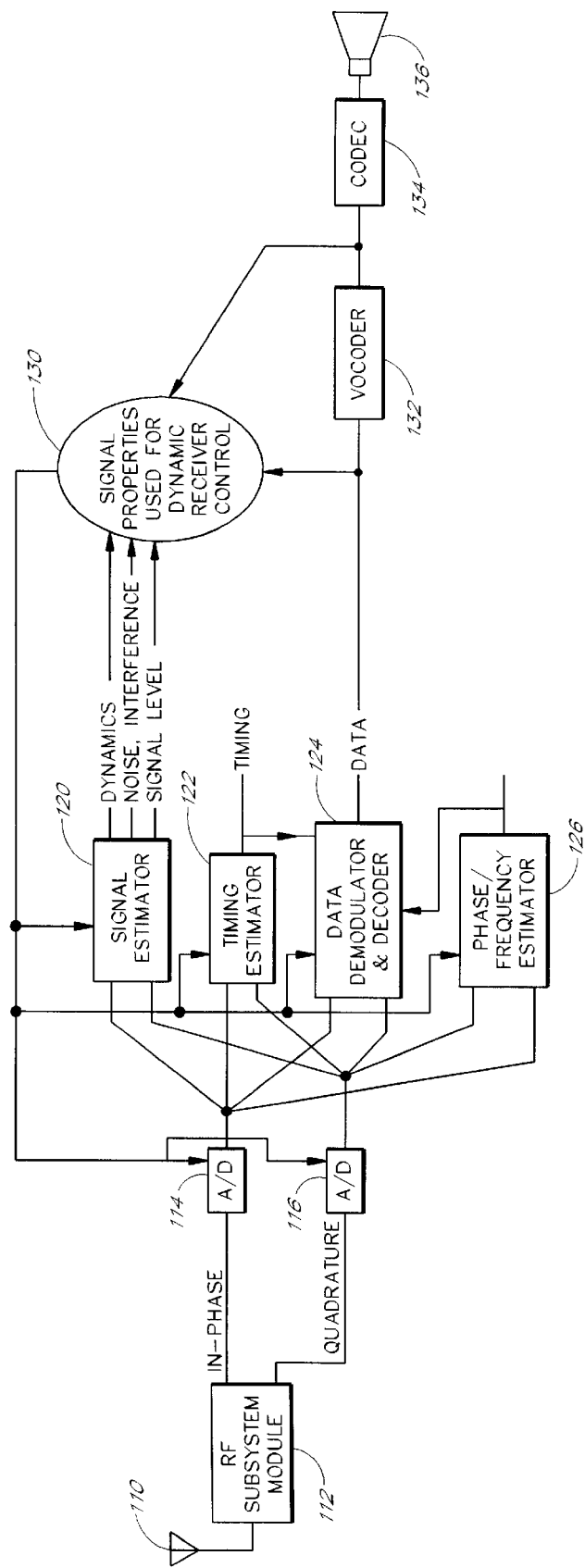
FIG. 1 is a block diagram of wireless communication system receiver.

FIG. 1 illustrates the basic components of a wireless communication system receiver as embodied in a cellular telephone communication receiver adopting code division multiple access (CDMA). Modern cellular communication systems generally comprise a plurality of base stations and mobile stations. Both of the base station and a mobile station incorporate a communication receiver. The present invention focuses on a system and method of reducing power consumption of a battery powered mobile station communication receiver and also, improving performance when necessary. The base stations are typically wired to a land based power source. For purposes of explanation, a general overview of a receiver in one preferred embodiment is provided below. In general, the receiver comprises an antenna 110 coupled to a radio frequency (RF) subsystems module 112. This module 112, provides two outputs (I,Q) to analog-to-digital (A/D) converters 114, 116. Each of the A/D converters 114, 116 connects to signal estimator 120, a timing estimator 122, a data demodulator 124, and a phase and frequency estimator 126. In turn, the output of the timing estimator 122 and the phase and frequency estimator 126 couple to inputs of the data demodulator 124. The output of the data demodulator 124 couples to a vocoder 132 and a signal properties evaluation module 130. The vocoder's output couples to a codec 134 and the signal properties evaluation module 130. The output of the codec 134 couples to an amplified speaker 136 for audio reproduction.

In operation the antenna 110 converts arriving radio frequency signals to electrical signals for the radio frequency (RF) subsystems module 112. The RF subsystems module 112 amplifies the incoming signal before performing frequency translation and band pass filtering on the signal. The RF subsystem provides the in-phase (I) and quadrature-phase (Q) portions of the incoming signal to A/D converters 114, 116. The A/D converters 114,116 convert the incoming analog signal to a digital format. Conventionally, the A/D converters 114,116 are configured with a predetermined precision for the conversion process.

The signals exiting the A/D converters 114,116 enter the signal estimator 120, a timing estimator 122, a phase and frequency estimator 126, and a data demodulator 124. The output of the timing estimator 122, and phase and frequency estimator 126 connect to the data demodulator 124 to provide data necessary for the demodulation and decoding of the voice signal.

The timing estimator 122 determines the timing of the signal in relation to a synchronization signal to obtain signal alignment during decoding and demodulation. In one preferred embodiment, the timing estimator 122 comprises a delay lock loop (DLL), which is described in more detail below in conjunction with FIG. 3.

The phase and frequency estimator 126 determines the phase and frequency of the incoming signal which, as known by those familiar with receiver operation, aids in the demodulation process.

The signal estimator 120 determines the signal to noise ratio, signal dynamics, and the signal strength level and provides these values to the signal properties evaluation module 130. As discussed in more detail below, the signal properties evaluation module 130 uses these values for dynamic receiver control.

The data demodulator and decoder 124 demodulates the signal from radio frequency and performs reverse coding on the signal. In one embodiment the coding comprises code division multiple access (CDMA).

The output of the data demodulator and decoder 124 is coupled to the signal properties evaluation module 130 and the vocoder 132. The signal properties evaluation module 130 uses the demodulated and decoded data to estimate the bit error rate (BER) and the frame error rate (FER) which in turn are used to further evaluate the incoming signal. The vocoder 132 generally comprises an electronic speech analyzer as known in the art.

The output of the vocoder 132 is coupled to a codec 134 input. As known in the art, the codec 134 converts the digital signal to an analog signal. The corresponding signal exits the codec 134 for receipt by a speaker 136 which audibly reproduces the signal. An optional amplifier, not shown, may exist between the codec 134 and the speaker 136.

Optionally, the signal may comprise data information which would not require conversion of the signal to an analog format. Hence, a receiver configured to process non-voice data would lack componentry for processing voice, such as the vocoder 132 and codec 134.

The signal properties evaluation module 130 provide feedback to the A/D converters 114, 116, the signal estimator 120, the timing estimator 122, the data demodulator and decoder 124, and the phase and frequency estimator 126 in accordance with various aspects of the present invention in order to facilitate dynamic control of the various blocks of the receiver for changing signal quality and/or power reduction purposes.

Analog to Digital Converters Incorporating Signal Quality Feedback

Figure 2:
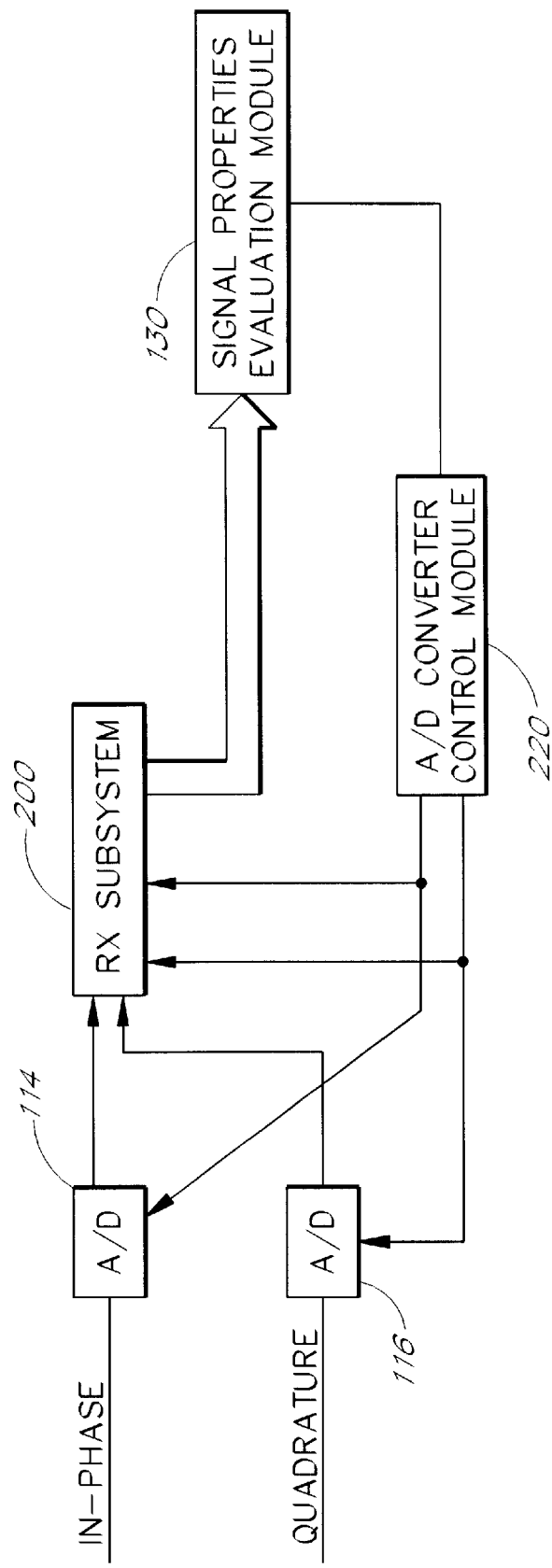
FIG. 2 illustrates the front end of a digital communication receiver with analog to digital converters incorporating signal quality feedback.

FIG. 2 illustrates one embodiment of the present invention. At the front end of a receiver adopting CDMA principles, the signal is divided into its in-phase (I) and quadrature-phase (Q) components. Each of these respective signals enters one of the analog to digital converters 114, 116. The analog to digital converters 114,116 converts the incoming analog signal to a digital representation of the signals.

In conventional systems, the precision of each A/D converter 114,116 is held constant, typically at 5 bits. The output of the A/D converters 114,116 couple to the other receiver subsystems 200. The receiver subsystems 200 comprises componentry such as the signal estimator 120, timing estimator 122, data demodulator 124, and the phase and frequency estimator 126, shown in greater detail in FIG. 1. Accordingly, the precision of the A/D converters impacts the processing of the majority of the remaining receiver subsystems, as depicted in FIG. 1. As explained previously in conjunction with FIG. 1, the output of the signal estimator 120 connects to the signal properties evaluation module 130. The signal properties evaluation module 130 is in communication with the A/D converters via an A/D converter control module 220. The control decision module connects to each of the A/D converters 114,116. Of course, the A/D converter control module 220 can be considered part of what could be combined with the signal properties evaluation module 130. In other words, the control for the A/D converters 114, 116 can be generated directly from the signal properties evaluation module whereby the separate A/D converter control module 220, which receives input from the signal properties evaluation module 130, is made up of one module or multiple modules or combined with the signal properties evaluation module 130. The independent depiction in the figures of the present application is provided to facilitate the description of the system.

In operation, real-time feedback from the signal properties evaluation module 130 controls the operating precision of the A/D converters 114,116. In particular, the in-phase and quadrature phase components of the incoming signal enter the A/D converters 114,116. At the inception of the communication link, the precision of the A/D converters 114,116 is set to a first precision level, in one embodiment, the highest precision level provided by the A/D converters 114, 116. The A/D converters 114, 116 modify the incoming signal to a digital format and forward the signal to the other components of the receiver. One component of the receiver which obtains the output of the A/D converters 114,116 is the signal estimator 120, which is incorporated in FIG. 2 in the receiver subsystem 200. The signal estimator 120 evaluates the digitized signal to determine dynamics, noise and interferences level and the signal strength. These values are forwarded to signal properties evaluation module 130.

The evaluation module 130 processes the information from the signal estimator 120 (and other inputs as depicted in FIG. 1) and arrives at a determination of the signal quality and stability, referred to herein as the signal properties or characteristics. The signal properties are forwarded to the A/D converter control module 220 which evaluates the signal properties. Based on the evaluation of the incoming signal, the control module 220, which is in communication with the A/D converters 114,116, adjusts the precision level of the A/D converters. Advantageously, the A/D converters can be adjusted separately. An evaluation by the signal properties evaluation module 130 and the control module 220 indicating a generally stable signal prompts the control module to reduce the precision of each of the A/D converters 114,116. If signal quality is high enough on I or Q, one or the other signals may be entirely shut off. In one embodiment, when the signal is of high quality the control module 220 reduces the precision of each or one of A/D converter 114,116 to four, three, or even two bits. Reducing the precision of the A/D converters 114,116 reduces the power consumption of the receiver. Because the control module 220 only reduces the precision of the A/D converters 114,116 when the incoming signal is of high quality, the power consumption of the mobile station decreases without a compromise in audio quality. Because the precision of the A/D converters can drastically increase or decrease the total amount of data which must be processed by the remaining receiver components such as the signal estimator 120, the timing estimator 122, the data demodulator and decoder 124, and the phase and frequency estimator 126, the power savings resulting from the reduction of precision in the A/D converters 114, 116 can significantly impact the power consumption of the receiver. As further shown in FIG. 2, the control module 220 also connects to the receiver subsystems 200 to appropriately adjust the operating precision of the other aspects of the receiver. In particular, when the control module 220 reduces the precision (number of bits) of the A/D converters 114,116, the components which receive the output of the A/D converters will also operate in a reduced precision mode. If one of the I or Q signals is completely discontinued due to very high signal quality on the other signal, receiver subsystems which respond to the particular signal which has been discontinued would be completely deactivated in one embodiment, further reducing power.

Conversely, if the evaluation module 130 and control module 220 ascertains that the signal quality is poor, the control module increases the precision of either or both of the A/D converters 114,116. In this fashion the precision of the A/D converters 114, 116 dynamically adjust depending on the quality of the incoming signal.

The degree or percentage of power consumption achieved using these principles varies depending on the receiver subsystems 200 components. In one embodiment, the reduction in operating precision in the front end A/D converters 114,116 can result in an overall reduction in receiver power consumption of about 20 percent, while degrading signal quality by less than about 0.8 dB. This correlates to an overall reduction in chip power usage of approximately 5% to 10% in the present embodiment. Furthermore, with the reduction in power consumption during periods of high signal quality, for the same power usage over time, the precision of the A/D converters 114, 116 can be increased during periods of poor signal quality to enhance communication performance without increasing the overall power usage over time.

Timing Estimator Incorporating Signal Quality Feedback

Figure 3:
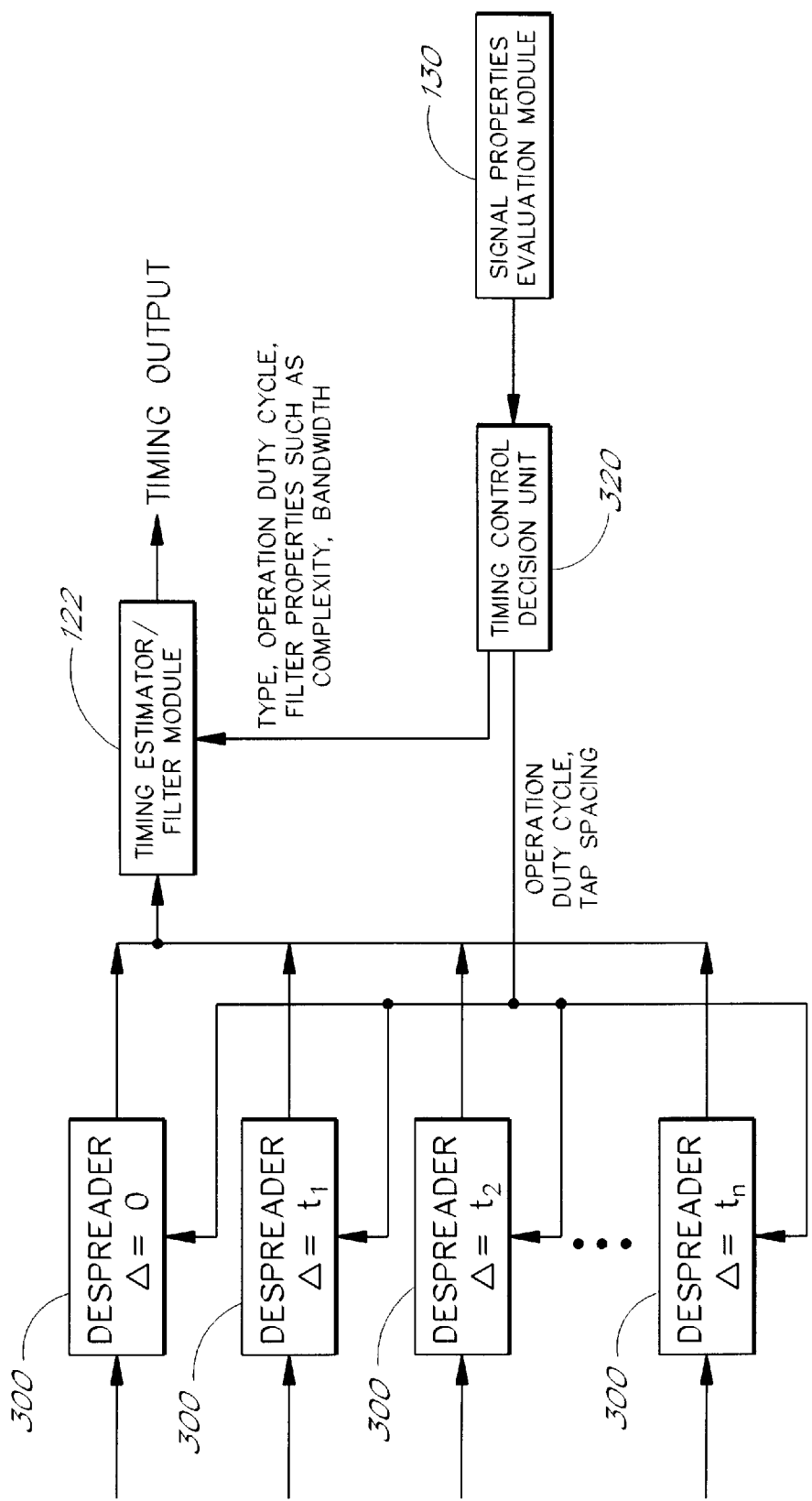
FIG. 3 illustrates a timing estimator incorporating signal quality feedback.

Modem communication receivers utilize some form of signal synchronization to properly track, demodulate and decode the incoming signal. One example of such a synchronization mechanism is a delay lock loop which serves to synchronize the incoming signal with an internal or known clock or timing signal. FIG. 3 illustrates a synchronization mechanism known as a timing estimator incorporating signal quality feedback.

A receiver includes a number of despreaders 300, each coupled to a timing estimator and filter module 122 (e.g., a delay—lock-loop or DLL). The output of the timing estimator and filter module 122 connects to the data demodulator, as shown in FIG. 1. Also shown in FIG. 3 is the signal properties evaluation module 130 which obtains information regarding the incoming signal and, upon processing the information, determines the quality and/or dynamics of the incoming signal. The output of the signal properties evaluation module 130 connects to a timing control decision unit 320. The output of the signal properties evaluation module couples to each of the despreaders 300 and the timing estimator and filter module 122 via the timing control decision unit 320.

In conventional systems, the timing estimator and filter module 122, (e.g., the DLL), operates constantly, and at a fixed rate of sampling. However, in accordance with the principles of the present invention, the timing estimator and filter module 122 can operate all the time, intermittently, or at a reduced rate.

In the present embodiment, each of the despreaders 300 outputs a signal recovered from the spread spectrum data transmission to the timing estimator and filter module 122. The timing estimator and filter module 122 receives and processes the despread signals to synchronize the signals. A timing signal is provided to the demodulation unit 124 (FIG. 1) for use in demodulation.

The signal properties evaluation module 130 simultaneously provides information regarding the quality and/or dynamics of the incoming signal to the timing control decision unit 320. The timing control decision unit 320 evaluates the information describing the incoming signal properties and provides control information to the timing estimator and filter module 122 and each of the despreaders 300.

The timing estimator and filter module 122 and each of the despreaders 300 may alter its operation based on the input from the timing control decision module 320. For example, the timing control decision module 320 provides data to the timing estimator and filter 122 to thereby control the type, operation duty cycle, and filter properties, such as complexity and bandwidth. The information provided from the timing control decision unit 320 to the timing estimator 122 changes depending on the quality of the signal. The timing estimator and filter module 122 uses this information to adjust its operation to save power when the incoming signal is of high quality and/or increase performance during periods of low signal quality and/or high dynamics.

More specifically, based on the timing error, the DLL 122 can modify its operation. For instance, if the timing error becomes very small on repetitive samples, the duty cycle, or percentage of time that the DLL 122 operates, can be adapted to save power. In other words, in periods of small error in timing, the duty cycle of the DLL 122 can be decreased for less frequent operation. In times of higher timing error, the duty cycle of the DLL 122 can be advanced for more frequent sampling. Similarly, the DLL type can be adjusted for better or poorer timing error. Furthermore, the DLL type can be altered during periods such as pull-in or reacquisition to provide necessary performance during these periods. For example, during pull-in, the DLL may utilize four taps and then adjust the tap spacing to two when the delay is estimated. Accordingly, only the processing complexity necessary to maintain signal timing is required.

As known in the art, timing estimators and associated filters, such as a DLL, begin operation after the initial signal search process occurs to achieve precise synchronization and tracking. The DLL generally comprises a first correlator beginning operation early and a second correlator beginning operation later in relation to the optimum sampling time. An error signal is formed by taking the difference between the two absolute values of the two correlator outputs. A non-zero error signal indicates that the timing of the synchronizing signal is incorrect relative to the optimum sampling time. Accordingly, the synchronization signal is either retarded or advanced, depending on the sign of the error. Operating this loop adjusts the synchronization signal.

During periods of general stability with regard to the incoming signal, the error signal is generally zero and hence the timing of the synchronization signal remains generally unchanged. Alternatively, when the incoming signal is generally unstable and possesses high dynamics or interference, the error signal is generally non-zero and the timing estimator 122 continually evaluates and adjusts the synchronization signal.

Based on the above described operation of an embodiment of the present invention using a DLL, the timing control decision unit 320 evaluates the incoming signal based on input from the signal properties evaluation unit 130 and adjusts the behavior of the DLL to use power efficiently and/or provide increased reliability in times of low signal quality. For example, during periods of general stability, the timing control decision unit 320 adjusts operation of the DLL by reducing the duty cycle, the complexity and/or bandwidth of the filters, all of which reduce power consumption of the receiver.

The timing control decision unit 320 also provides data to the despreaders 300 to control the tap spacing of the despreaders. The information provided from the timing control decision unit 320 to the despreaders 300 alters the operation of the despreaders to use power efficiently by reducing power usage during periods when the incoming signal is of superior quality. For example, the control information provided to the despreaders 300 may alter the despreaders tap spacing to save power during periods when the incoming signal is of high quality.

In this fashion the receiver monitors the quality of the incoming signal and adjusts the operation of the timing estimator and filter module 122 and the despreaders 300 to reduce the power consumption when the signal is of high quality and generally stable. Alternatively, during periods of poor signal quality, the operation is made more robust, at the cost of additional power consumption.

Equalizer Incorporating Signal Properties Feedback

Many modem communication systems, such as systems employing time division multiple access (TDMA) and code division multiple access (CDMA), often employ a type of receiver known as a RAKE receiver. A RAKE receiver has a number of receivers, or "fingers," each of which are configured to obtain a portion of a radio signal. Receivers employ such a configuration because, in most communication systems, the channel characteristics are unknown or time-variant. One example is when a transmitted signal encounters obstacles in the path between the transmitter and receiver. Because of the obstacles, the resulting signal includes energy peaks which are spread over time. In particular, the incoming signal is often separated into a number of peaks or time-varied portions each of which contain important signal information. Each of the fingers of a RAKE receiver obtains the information at each of the peaks of the incoming signal. However, the energy at each of the peaks may become misaligned or smeared, thereby preventing the fingers of the rake receiver from properly obtaining the signal.

To overcome the misalignment of the peaks in the incoming multipath signal, modem communication systems often employ equalizers. The equalizer removes certain time delayed waves or signal portions. In particular, equalizers detect the delayed portions of the signal and lock onto the strongest portions. Equalizers may operate by using a training sequence that is sent at the start of the data communications burst. The equalizer then adjusts itself to provide the maximum response on the channel, thereby negating the deteriorating effects of the radio channel itself.

Undesirably, the one or more equalizers in a receiver of a modern communication system operate continuously during an active communication link. The continuous operation of the equalizer is desirable when the peaks of a multipath signal are misaligned. However, continuous operation of the equalizers in a mobile station when the incoming signal is generally stable and not in need of equalization consumes valuable battery power. One embodiment of the present invention comprises adjusting the complexity and/or duty cycle of the equalizer based on the characteristics of the incoming signal to reduce power consumption and/or increase performance as needed.

Figure 4:
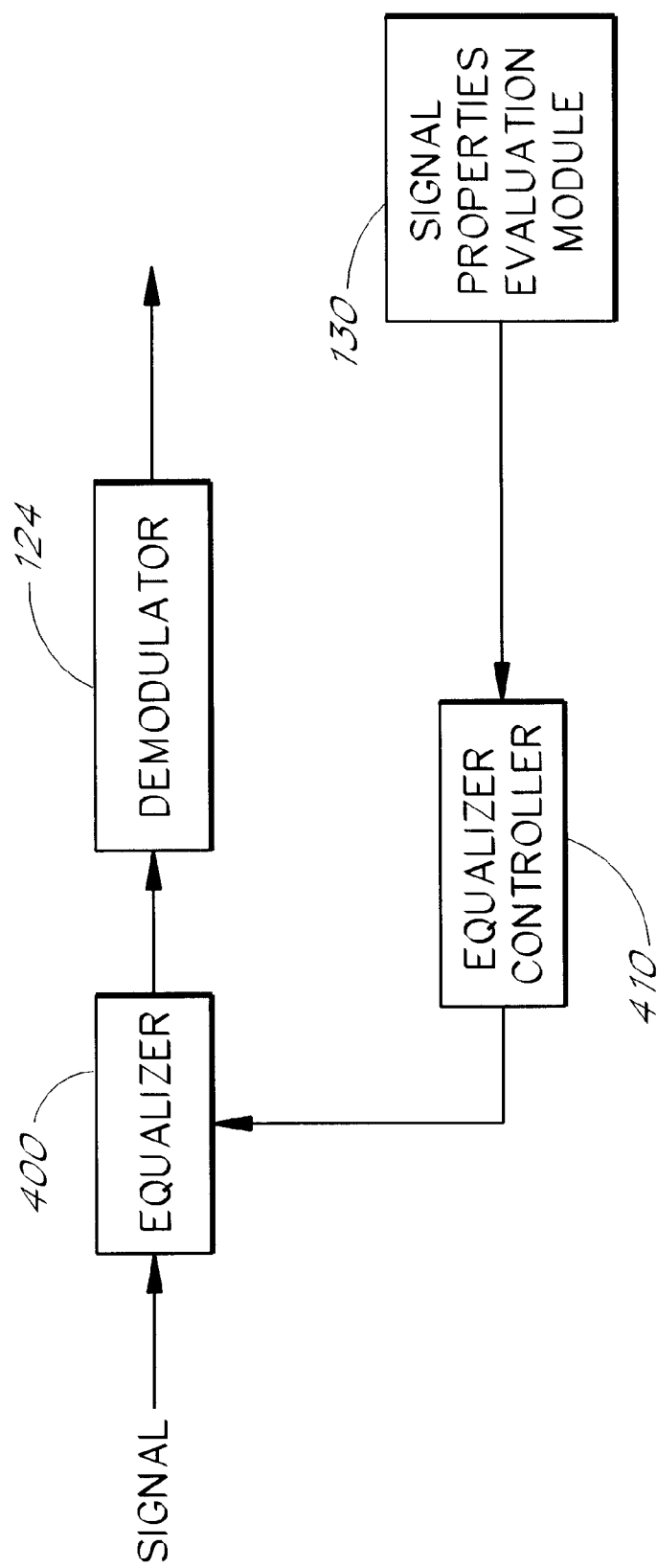
FIG. 4 illustrates equalizer incorporating signal properties feedback.

FIG. 4 illustrates one embodiment of an equalizer configured for adaptive operation in accordance with the principles of the present invention. In particular, with regard to signal equalization, the relevant portion of a wireless communication receiver comprises an equalizer 400 having a first input configured to receive a signal, a second input coupled to an output of an equalizer controller 410, and an output coupled to the demodulator 124. The input of the equalizer controller 410 couples to the output of the signal properties evaluation module 130, which is described above in greater detail.

In operation, the components illustrated in FIG. 4 cooperate to receive a signal at the first input of the equalizer 400. In one embodiment, at start-up, the equalizer 400 enters a full operation mode wherein the signal improving capabilities of the equalizer are fully operational. After fully equalizing the incoming signal, the equalizer passes the signal to the demodulator 124 for additional signal processing. The output of the demodulator 124 passes to other receiver subsystems (see FIG. 1).

Other subsystems of the receiver (FIG. 1) provide information regarding the signal to the signal properties evaluation module 130. The signal properties evaluation module 130 processes and feeds the processed information to the equalizer controller 410. The equalizer controller 410 further evaluates the signal characteristics based on the information from the signal properties evaluation module 130 and, based on this evaluation, outputs control information to the equalizer 400. The control information dictates the duty cycle and complexity of operation of the equalizer 400.

The amount of power used by the equalizer 400 depends upon the duty cycle of the equalizer 400 and the complexity of the equalizing algorithms used in the equalizer 400. In one embodiment, the equalizer 400 can be completely disabled when the peaks in an incoming signal are readily discernible and the equalizer can be re-activated when the peaks become "smeared." For example, the equalizer 400 enters a power saving mode when the signal properties evaluation module 130 and the equalizer controller 410 determine that the incoming signal no longer requires extensive equalization. Conversely, the equalizer returns to full equalization when instructed that the incoming signal requires equalization to maintain communication quality and prevent dropped calls. In this manner the equalizer's overall power consumption is minimized without sacrificing signal quality and communication link integrity.

RAKE Finger Duty Cycle Adjustment and Combiner Algorithms Adjustment

Figure 5:
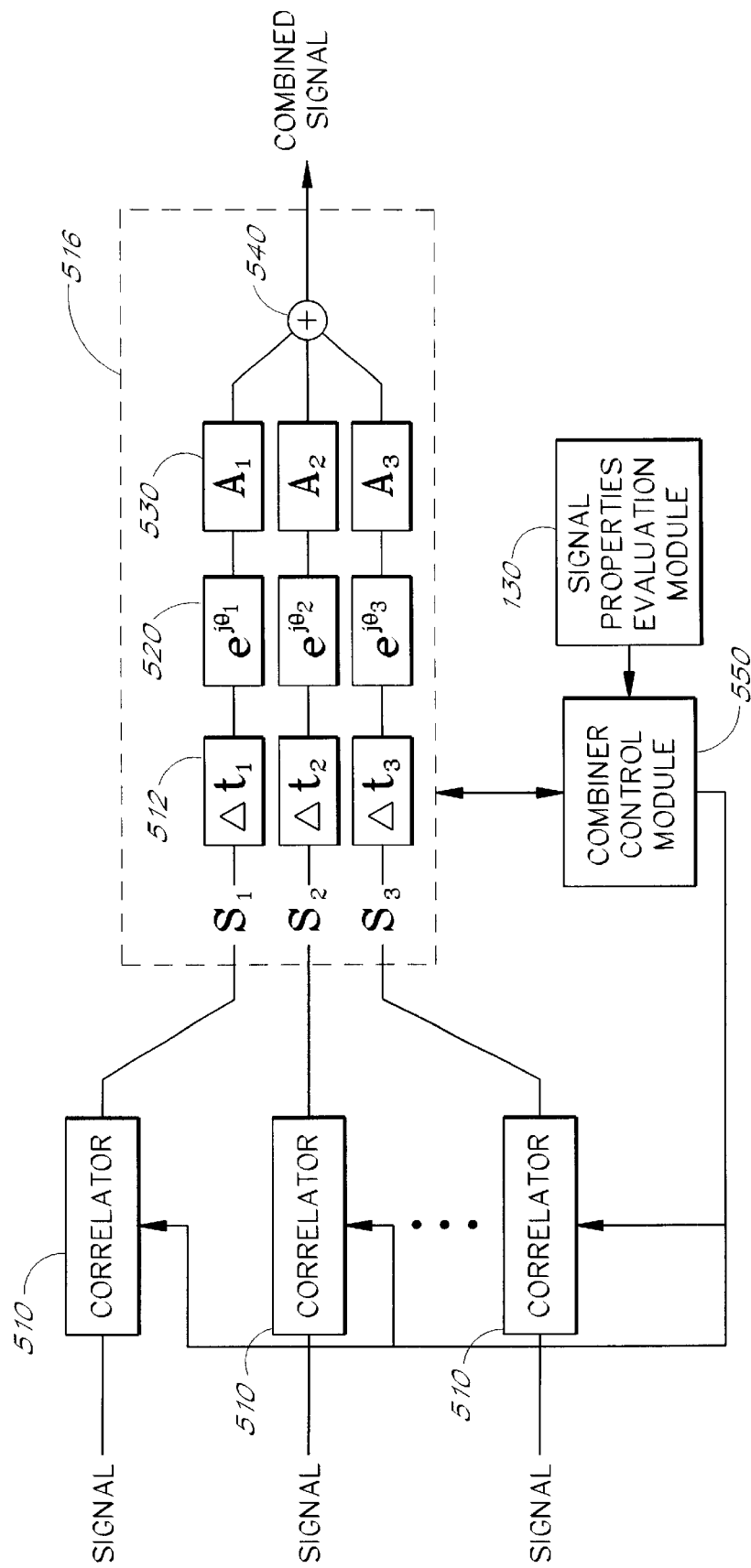
FIG. 5 illustrates a basic block diagram of a combiner having adaptive performance.

FIG. 5 illustrates a combiner in a RAKE receiver. A CDMA receiver employs multiple correlators also known as fingers. The multiple correlators reduce a receivers susceptibility to multipath components because the receiver can simultaneously receive several multipath signals and coherently combine them, resulting in a stronger signal. The RAKE receiver also enables a mobile station to communicate with two base stations simultaneously, making soft hand-offs possible and greatly reducing the probability of dropped calls.

Present systems operate every finger of the RAKE receiver at full precision during the entirety of each active communication link. Operating each finger of the RAKE receiver at full precision maintains audio quality during signal fading and when the signal contains multipath components. However, operating every finger of the RAKE receiver and the combiner at full precision when the incoming signal is of high quality needlessly consumes battery power. The embodiment described herein dynamically adjusts the duty cycle of the fingers of the RAKE receiver and varies the complexity of the combiner algorithms to save power when the signal is of high quality.

As shown in FIG. 5, one preferred embodiment comprises several correlators 510, each of which couple to a combiner 516. The output of a combiner control module 550 couples to the combiner 516 and each of the correlators 510. The combiner control module has an input connected to the signal properties evaluation module 130, discussed in conjunction with FIG. 1.

The combiner 516, which receives the signals from each of the fingers of the RAKE receiver, adds each of the multipath signals and provides an output to the other subsystems of the receiver.

In particular, each of the correlators 510 provides a portion of the incoming signal to the combiner 516. In turn, the combiner 516 uses an algorithm to calculate parameter values that aid in the combination of each of the incoming multipath signals from the correlators 510. These parameter values represent the required time shift, phase shift and amplitude adjustment necessary to properly combine each of the multipath signals. The combiner 516 processes the incoming signals using the parameter calculations and provides a combined signal at the output.

Advantageously, a receiver adopting the principles of the present invention includes the combiner control module 550. The combiner control module 550 provides input to the combiner 516 and each correlator 510 to dynamically adjust the duty cycle of the correlators and the manner of operation of the combiner to reduce power consumption. The combiner control module 550 evaluates various characteristics of the incoming signal and, based on the evaluation, provides appropriate input to the combiner 516 and the correlators 510. The combiner control module 550 obtains information regarding the incoming signal from the signal properties evaluation module 130. In particular, the signal properties evaluation module 130 provides information regarding the signal dynamics, the signal to noise ratio, the signal interference level and the signal power level to the combiner control module 550. Using this information, the combiner control module 550 adjusts the duty cycle of the correlators 510 and the manner of operation of the combiner 516 to reduce power consumption.

With regard to the correlators 510, the combiner control module 550 alters the duty cycle of each correlator based on the incoming signal. For example, if the incoming signal is generally weak and contains a number of multipath components, then the combiner control module 550 enables the maximum number of correlators 510, thereby capturing the weak signal. Alternatively, if the signal properties evaluation module 130 indicates that the signal is generally strong and comprises relatively few (one or two) multipath components, then the control module 550 instructs a number of the correlators 510 to suspend operation. Suspending operation of a number of the correlators 510 reduces the power consumption of the receiver, which extends battery life. Suspending operation of a number of correlators 510 reduces the input to the combiner 516, which consequently reduces the processing burden on the combiner 516. This further reduces the power consumption of the receiver.

The combiner control module 550 also instructs the combiner 516 to dynamically change the algorithms used for parameter estimation. In particular, mobile stations (i.e., a cellular telephone) may operate while stationary or while moving, such as during automobile travel. For a receiver, and in particular the combiner 516, a significant amount of processing (and therefore power) is required to estimate the parameters used to calculate time shift 512, phase shift 520 and amplitude adjustment 530 of each component of the incoming signal before summing with the summer 540 each adjusted signal component. Precise calculation of these parameters is vital during periods when the incoming signal includes significant multipath components, such as for example when the mobile station is moving or when reflecting objects such as building, are intermediate the mobile station and the base station. However, such complex calculations needlessly consume power during periods when the incoming signal does not include a plurality of significant multipath components, such as for example when the mobile station is generally stationary or when it possesses an obstruction free signal path to the base station. Instead of performing complex calculations, the parameters used to determine time shift, phase shift and amplitude adjustment are arrived at using calculations which consume less power or by fixing the parameter values for certain signal conditions. Thus, the power consumption may be reduced without compromising audio quality or communication link stability.

Figure 7:
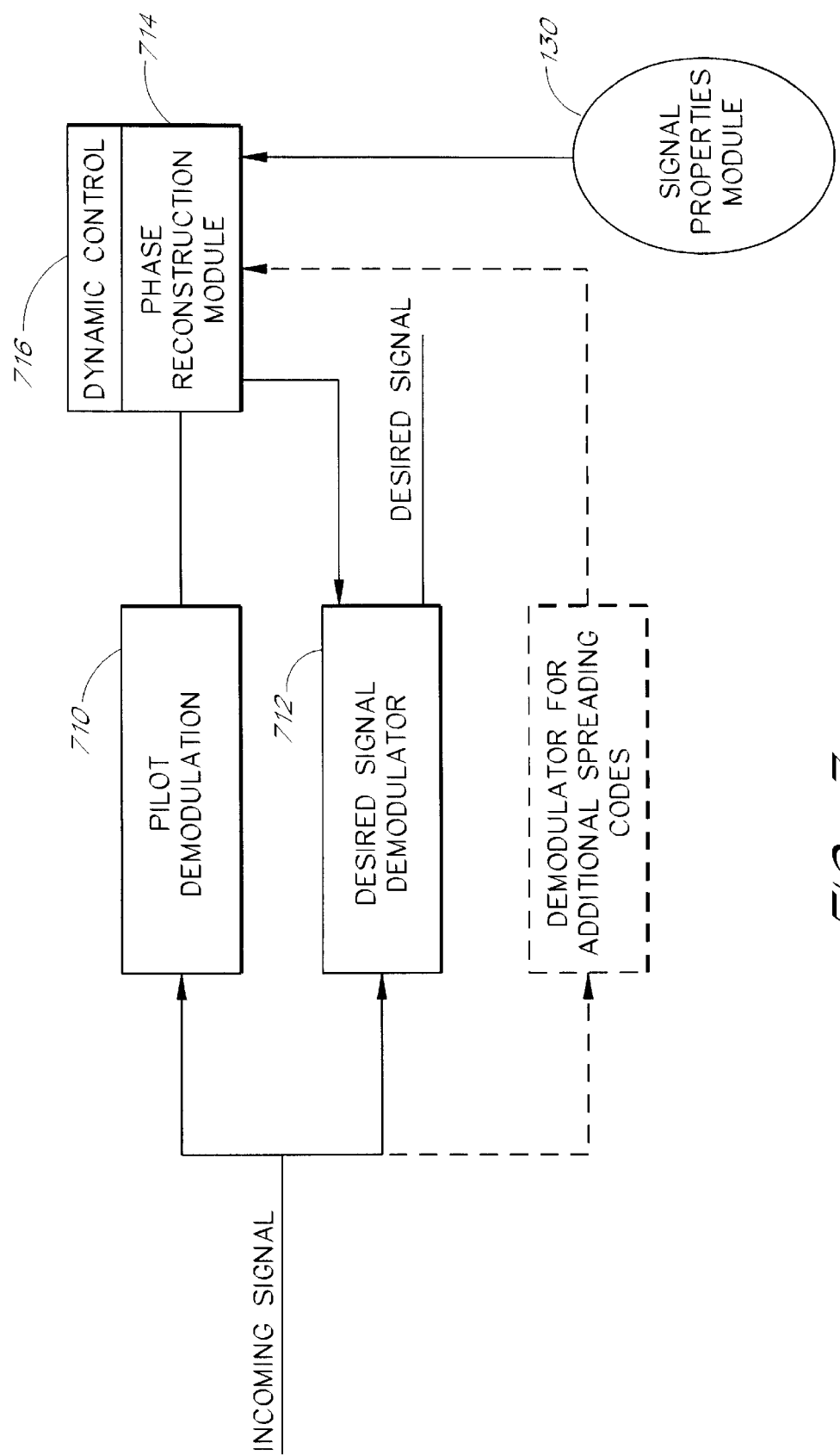
FIG. 7 illustrates a frequency estimation block diagram for an adaptive frequency estimator.

FIG. 7 illustrates an enhanced frequency estimator to provide adaptive frequency estimation (phase reconstruction) such as in the phase/frequency estimator 126 of FIG. 1. As seen in FIG. 7, there is demodulator 710 provided for a pilot signal and demodulator 712 provided for a desired signal. A phase reconstruction block 714 provides phase estimation for the desired signal. Accordingly, an output of the phase reconstruction block 714 provides an input to the desired signal demodulator 712. The incoming signal (after digital conversion in the present embodiment), provides an input to both the pilot demodulator 710 and the desired signal demodulator 712. The phase reconstruction module 714 receives input from the pilot demodulator 710 and from the signal properties module 130 (see FIG. 1). More specifically, the signal properties module 130 provides signals to a dynamic phase reconstruction control module 716 which forms part of the phase reconstruction module 714. The dynamic phase reconstruction control module 716 reacts to information from the signal properties module 130 and from the pilot demodulator 710 to dynamically control the phase reconstruction module 714 to accommodate changing signal conditions. More specifically, the phase reconstruction module operations can be adaptively controlled to change operations based on the particular signal properties at the time.

As known in the art, a phase reconstruction scheme can be very important because a small error in the estimated phase can result in a large loss for the desired signal. Typically, existing systems utilize the pilot signal which is transmitted at a higher power without full spreading codes so that it is much easier to demodulate. Accordingly, the demodulation allows determination of the phase of the incoming signal. Because the pilot signal and the desired signal are transmitted together, they experience similar or identical paths and interference to the receiver. During periods of high signal dynamics and multi-path components, frequency estimation becomes an important function of the system in order to avoid significant signal losses.

In the present invention, the frequency estimation algorithm, precision, or active periods may be controlled. More specifically, any one or more of the following parameters could be included in selecting two or more algorithms which can be selected based upon the pilot demodulation information or the pilot demodulation together with the signal properties module information. The processing rate may be increased or decreased. Such increase or decrease may be based on power level rather than tracking performance. The phase reconstruction filter 714 may actually be deactivated and activated only a few to several times a second during periods of high signal strength and low signal dynamics and fading. However, during high signal dynamics, where the signal may have multi-path components and the phase is changing rapidly, the filter may run constantly. In addition or alternatively, the precision of the phase reconstruction filter 714 can be modified. For instance, the precision can be changed from 16-bit to 8-bit in one embodiment. In addition or in combination with the other elements, the actual filter type could be changed. For instance, a FIR filter, IIR filter, sliding window filter, or other type of filter could be selected based upon the signal characteristics.

Finally, as shown in FIG. 7, the signal properties module 130 could play a significant role in the phase reconstruction decisions. Conventional designs typically involve using the pilot signal to determine frequency estimation. The pilot is easy to demodulate because of its high power and lack of full spreading codes. In spread spectrum systems, each base station may have many desired signals, each with its own spreading code transmitted in a particular direction from the base station. Typical base stations in spread spectrum systems may have three different directional sections, each of which can have 10 to 20 signals with spreading codes (such as Walsh codes) for each signal. Accordingly, the signal from the base station includes a pilot plus several desired signals using several corresponding spreading codes. Typically, each mobile site demodulates the data resulting only from its own spreading code. However, because there are many other coded signals in the same collective signal, the present embodiment also involves utilizing the other spread spectrum signals not intended for the particular receiver in determining the phase reconstruction. In other words, the demodulated desired signal for other users can be used for tracking the phase, and, the tracking can be improved. Of course, the additional demodulation requires additional power; however, in periods of high signal dynamics, such increase in processing may be required in order to maintain a signal for the particular user in question.

In summary, in accordance with this embodiment of the present invention, several different features can come into play in impacting the phase reconstruction (frequency estimation) operations of the receiver.

GSM Demodulator having Reduced Power Consumption Design

In yet another embodiment, power saving features are integrated with a receiver operating in accordance with Global System for Mobile Communications (GSM).

Figure 6:
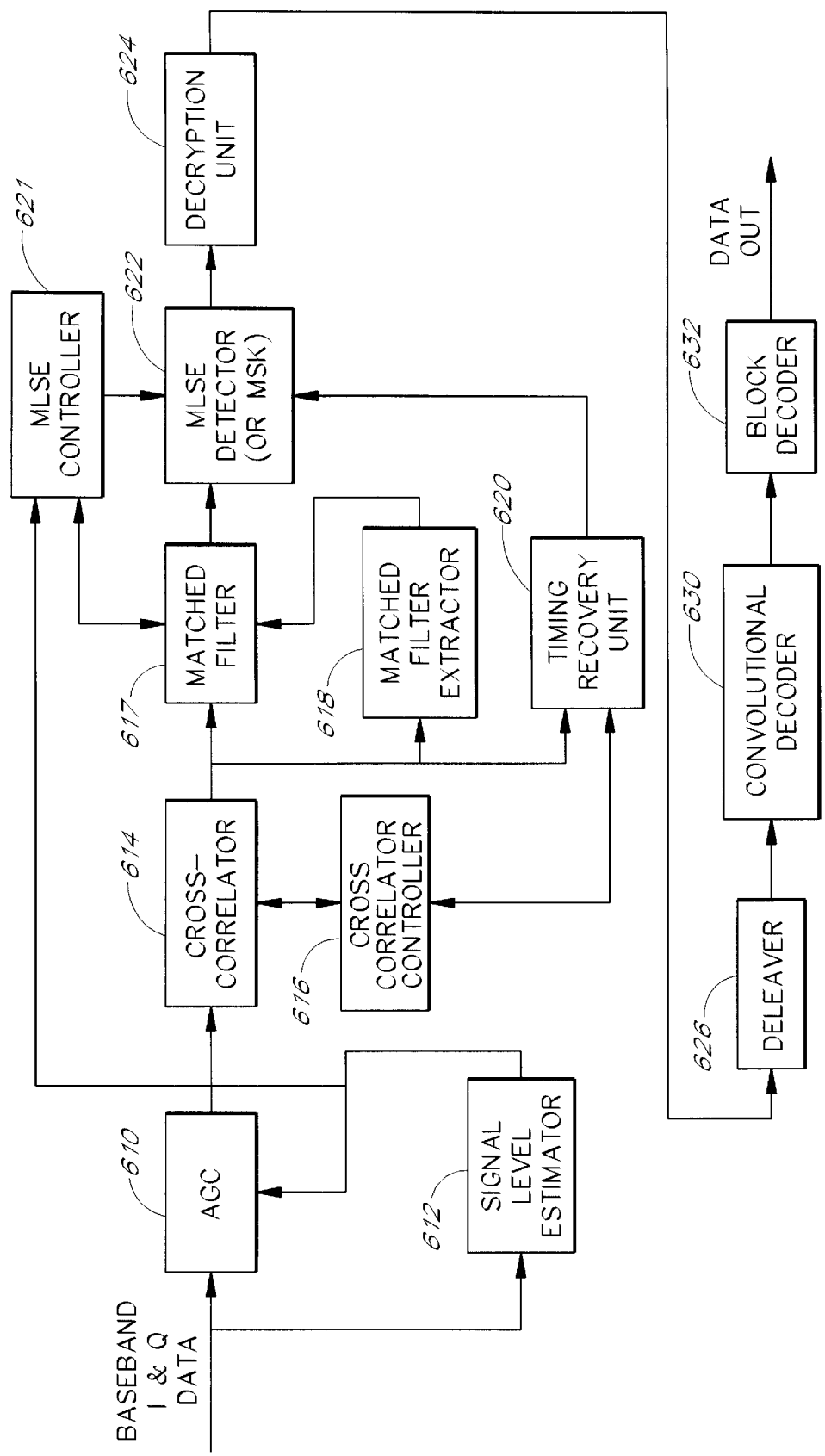
FIG. 6 illustrates a block diagram of a wireless communication receiver in a Global System for Mobile Communications.

FIG. 6 illustrates a typical Global System for Mobile Communication (GSM) demodulator. Input lines carrying baseband I (in-phase) and Q (quadrature-phase) data connect to an automatic gain control module 610 and a signal level estimator 612. The output of the signal level estimator 612 connects to the AGC module 610.

The output of the AGC module 610 connects to a cross-correlator 614. The cross-correlator's output connects to each of a matched filter 617, a matched filter extractor 618, and a timing recovery unit 620. The output of the matched filter extractor 618 feeds directly into the matched filter 617. The output of the matched filter 617 and the timing recovery unit 620 both connect to a Maximum Likelihood Sequence Estimation (MLSE) detector 622.

The MLSE detector 622 couples to the input of a decryption unit 624 and the output of the decryption unit feeds into a deleaver 626. The deleaver 626 outputs data to a convolutional decoder 630. The convolutional decoder 630 in turn connects to a block decoder 632. The block decoder 632 provides output on a data out line.

In operation, the automatic gain control module 610 adjusts the input signal level of the baseband I and Q data (hereinafter signal) for optimal performance during the subsequent demodulation operations as well understood in the art. The incoming signal also enters a signal level estimator 612 that estimates the power level of the incoming signal. Estimating the signal power level serves two purposes; first, a GSM communication system adapts its performance based on the strength of the received signal at each of the mobile stations; and second, the receiver adjusts the gain of the input signal for subsequent demodulation processes. Accordingly, the modulator provides the output of the signal level estimator 612 to the AGC module 610 so that the gain of signal may be adjusted appropriately.

The cross-correlator 614 compares the received data to a known training sequence or a training sequence included mid-sample in the received data burst. The cross-correlator locates the beginning of each burst of data using the known 26 symbols located at the center of each burst. As known in the art, bursts are sent in a generally 0.5 millisecond time frame followed by 4.5 millisecond pause. The cross-correlator, having located or correlated the known 26 symbols is able to locate the beginning of the data transmission.

Next, the signal undergoes filtering and timing recovery. The matched filter extractor 618 models an ideal matched filter to reverse the effects of the transmission channel and any inter-symbol interference introduced by the pulse shape. The timing recovery unit 620 determines the proper timing of the incoming signal to locate the center of the burst which in-turn allows the receiver to correctly separate and demodulate the individual symbols.

The next phase of the demodulation process comprises MLSE detection. The MLSE detector 622 performs a sophisticated detection algorithm that declares each received symbol to be a 1 or 0 and provides a measure of the certainty of each binary decision. As known in the art, the algorithms of the MLSE detector 622 employ a dynamic programming model to simultaneously demodulate an entire half-burst (typically 58 bits) of data. While certain advantages exist in performing demodulation over the half-burst instead on a symbol-by-symbol bases, half-burst demodulation consumes a significant amount of power during operation.

After MLSE detection, the signal enters a decryption unit 624 to reverse the anti-eavesdropping measures undertaken by the transmitter. Next, the signal enters the deleaver 626, wherein the transmitted bits are dispersed over several time division multiple access (TDMA) bursts to provide robustness in the presence of fading. The deleaver 626 rearranges the received bits into message blocks i.e. into the original order existing prior to transmission.

The output of the deleaver 626 progresses to the input of the convolutional decoder 630. The convolutional decoder 630 performs convolutional decoding on the received data. Convolutional coding and decoding provides means to detect and correct data errors introduced during transmission. In particular, convolutional coding adds coding to the data so that the convolutional decoder may accurately reconstruct the transmitted data, even if some of the data bits become corrupted during transmission.

After convolutional decoding, the signal enters the block decoder 632 to undergo reverse block coding. Block coding provides redundancy, typically parity bits. These parity bits are typically often transmitted at the end of a sequence of data bits so that upon receipt by the receiver, the block decoder 632 may perform reverse block coding to determine if errors exist in the data stream. After undergoing block decoding, the signal exits the block decoder 632 for further processing in other parts of the receiver, such as a vocoder (not shown).

In one embodiment of the present invention, the receiver comprises a digital signal processor (DSP) coded implementation of a GSM receiver. The inventors recognize that the most complex and power consuming operation is typically the MLSE detection algorithm of the MLSE detector 622. For example, in some DSP based implementations, the MLSE detection may comprise up to 50% of the complexity in relation to total DSP operations. While the advantages of the MLSE detector are worthy of its power needs during periods of poor signal quality, the MLSE detector needlessly consumes power when the signal is robust.

Another very complex and power consuming component is the cross-correlator 614 because it operates over a broad range of delays to correctly locate the center of the data burst. Cross-correlation in DSP based implementations may comprise up to 30% of the total DSP operations.

In one embodiment, a GSM receiver is configured to eliminate a substantial portion of the computational requirements of the receiver by monitoring the timing recovery unit 620 for rapid movement from center on a burst-by-burst basis. In such an embodiment, the receiver would also include a cross-correlator controller 616. The cross-correlator controller 616 connects to the cross-correlator and the timing recovery unit. The cross-correlator controller 616 obtains data from the timing recovery unit 620 and depending on the timing of the incoming signal, changes the operation of the cross-correlator accordingly. In particular, if the incoming signal does not demonstrate rapid movement from burst center then the cross-correlator controller 616 instructs the cross-correlator 614 to operate over a more narrow range of delays. For example, in normal operation the cross-correlator 614 may operate over ±5 data symbols. Under ideal situations, such as when the burst center is generally stable, performing cross-correlation over ±2 symbols may be adequate. In short, when assuming the data transmission to be generally stable, the cross-correlator can anticipate little change in burst center and reduce computational complexity such as, for example, evaluating fewer symbols. Reducing the computational complexity and duration of the cross-correlator 614 reduces the power consumption of the receiver which, in turn, extends battery life. If the timing recovery unit 620 detects rapid movement from burst center, then the cross-correlator controller 616 instructs the cross-correlator 614 to resume operation over a broader range of delays. In this fashion, the cross-correlator controller 616 adjusts the operation of the cross-correlator 614 to save power during periods when the signal is stable without degrading signal quality.

In another embodiment, the receiver includes a MLSE controller 621 connected to the MLSE detector 622, the matched filter 617, and the output of the signal level estimator 612. The MLSE controller receives input from the matched filter 616 and the signal level estimator 612. The MLSE controller 621 monitors both the signal level of an incoming transmission and the response to the matched filter 617. If the incoming signal level is high and the response to the match filter 617 indicates that the signal is arriving over a generally clear channel, then the receiver suspends operation of the complicated MLSE detector 622, and instead implements a simple bit-by-bit Minimum Shift Keying (MSK) demodulator. MSK demodulators are known by those of skill in the art, and require a trivial amount of computational resources, and thus battery power, in relation to the MLSE algorithms of the MLSE detector 622 due to their operation on a bit-by-bit basis instead of the typical 58 bit delay of the MLSE detector 622.

A receiver adopting MSK demodulation over MLSE algorithms consumes less power than a receiver utilizing only MLSE detection algorithms. Thus, if the signal is robust, the power intensive MLSE detector operation may be suspended and replaced with bit-by-bit MSK demodulation. Alternatively, if the signal changes causing the response to the matched filter 617 to not resemble a impulse and if the signal level decreases, then the MLSE controller 621 suspends operation of the bit-by-bit MSK demodulator and resumes operation of the MLSE algorithms. In this fashion, the MLSE controller 621 reduces power consumption of the receiver without sacrificing audio quality. As explained in the embodiment above, the signal level estimator and the match filter are used to determine the signal quality. Other quality measurements such as automatic gain control could be used to indicate the receiver algorithm which will be implemented for the remainder of the receiver.

Although the foregoing description of the preferred embodiment of the present invention has shown, described and pointed out the fundamental novel features of the invention, it will be understood that various omissions, substitutions and changes in form of the detail of the apparatus as illustrated as well as the uses thereof, may be made by those skilled in the art without departing from the spirit from the present invention. Consequently, the scope of the invention should not be limited to the foregoing discussion, but should be defined by the appended claims.

What is claimed is:

1. A power utilization control system for a wireless communications device, comprising:

a signal properties evaluation module, said module operative to evaluate the stability of a received signal, said module configured to provide an indication of said stability;

an analog to digital converter having at least two modes of operation, said analog to digital converter responsive to said signal properties evaluation module to operate in at least one of two modes, based upon said stability, wherein said first mode comprises operation at a first precision and said second mode comprises operation at a second precision;

wherein said analog to digital converter is configured to respond to said signal properties evalaution module so as to limit the amount of power consumed by said wireless communications device; and an analog to digital converter control module responsive to said signal properties evaluation module to select the precision of said analog to digital converter based upon said indication of said stability.

2. The power utilization control system of claim 1, wherein signal properties evaluation module is implemented using a digital signal processor.

3. The power utilization control system of claim 1, wherein said signal properties evaluation module is configured to evaluate any of signal dynamics, signal noise levels, or signal strength.

4. The power utilization control system of claim 1, wherein said wireless communications receiver operates in accordance with code division multiple access.

5. The power utilization control system of claim 1, wherein said analog to digital converter is configured to select a lower bit precision for said at least one analog to digital converter when the signal is of generally high quality.

6. The apparatus of claim 1, wherein said signal properties evaluation module is operative to evaluate the quality of said received signal, and is configured to provide an indication of said quality, wherein said analog to digital converter is responsive to said indication of said quality.

7. The apparatus of claim 6, wherein said analog to digital converter module is responsive to said signal properties evaluation module to select said precision of said analog to digital converter based on upon said indication of said quality.

8. A method of reducing power consumption in a wireless communications receiver having an analog to digital converter comprising:

receiving a signal;

monitoring the characteristics of the incoming signal;

evaluating the stability of the incoming signal; and altering the precision of said analog to digital converter based on the evaluated stability of the incoming signal so as to limit the amount of power consumed by said wireless communications receiver.

9. The method of claim 8, wherein altering the precision of the analog to digital converter comprises altering the precision between 5 bits and 2 or 3 bits.

10. The method of claim 8, wherein monitoring the characteristics of the incoming signal comprises monitoring any of signal dynamics, signal noise, signal level, bit error rate, or field error rate.

11. The method of claim 8, wherein said method is implemented in a communication receiver operating in accordance with code division multiple access.

12. The method of claim 8, wherein evaluating the characteristics of said incoming signal comprises determining the proper precision setting for said analog to digital converter.

13. The method of claim 8, further comprising:

evaluating the quality of said incoming signal; and altering the precision of said analog to digital converter based on the evaluated quality of said incoming signal so as to limit the amount of power consumed by said wireless communications receiver.

14. A power utlilization control system for a wireless communications device comprising:

means for evaluating characteristics of a received signal for determining signal stability; and means for actively reducing the precision of analog to digital converters in response to said received signal stability so as to limit the amount of power consumed by said wireless communications receiver.

15. The system of claim 14, further comprising:

means for evaluating characteristics of said received signal for determining signal quality; and means for actively reducing the precision of said analog to digital converter in response to said received signal quality so as to limit the amount of power consumed by said wireless communications receiver.

* * * * *